United States Patent [19]
Miyazaki

[11] Patent Number: 5,904,310
[45] Date of Patent: May 18, 1999

[54] DOUBLE BEARING TYPE OF A FISHING REEL HAVING A ROTATABLE AND SLIDABLE CLUTCH MEMBER SUPPORTED BY A BEARING

[75] Inventor: Takeo Miyazaki, Tokyo, Japan

[73] Assignee: Daiwa Seiko, Inc., Tokyo, Japan

[21] Appl. No.: 08/966,477

[22] Filed: Nov. 7, 1997

[30] Foreign Application Priority Data

Nov. 8, 1996 [JP] Japan ..................................... 8-296795
Nov. 8, 1996 [JP] Japan ..................................... 8-296796

[51] Int. Cl.$^6$ ................................................... A01K 89/00
[52] U.S. Cl. .......................... 242/260; 242/259; 242/261; 192/52.2; 192/70.15; 192/107 R
[58] Field of Search .................................... 242/259, 260, 242/261, 262; 403/378, 379; 192/70.14, 70.15, 107 R, 48.92, 52.2

[56] References Cited

U.S. PATENT DOCUMENTS

| 1,064,889 | 6/1913 | Deves ......................................... 74/359 |
| 1,475,350 | 11/1923 | Marvin ....................................... 74/333 |
| 2,923,951 | 2/1960 | Beavis ....................................... 470/188 |
| 3,812,940 | 5/1974 | Svensson ............................... 192/17 R |
| 4,222,537 | 9/1980 | Noda .................................. 242/261 X |
| 5,123,609 | 6/1992 | Noda ......................................... 242/261 |
| 5,193,763 | 3/1993 | Sakaguchi ............................ 242/263 X |
| 5,205,511 | 4/1993 | Morimoto ................................ 242/261 |
| 5,299,758 | 4/1994 | Sato ......................................... 242/261 |
| 5,362,010 | 11/1994 | Takamatsu ............................... 242/261 |

FOREIGN PATENT DOCUMENTS 4-129771  11/1992  Japan .

*Primary Examiner*—Donald P. Walsh
*Assistant Examiner*—Emmanuel M. Marcelo
*Attorney, Agent, or Firm*—Sughrue, Mion, Zinn, Macpeak & Seas, PLLC

[57] ABSTRACT

A fishing reel of a double bearing type includes a clutch member having an engaging portion which, during the movement of the clutch member between its rotation force transmission position and rotation force cut-off position, is caused to move along the inner peripheral surface of a bearing, wherein the engaging portion of the clutch member is structured such that, during the above movement, it is situated in the range of the inner peripheral surface of the bearing in a direction extending along the rotation axis of the spool shaft, and further wherein a clutch engaged portion engaged with the engaging portion is also structured such that it is situated in the range of the inner peripheral surface of the bearing in the direction extending along the rotation axis of the spool shaft.

10 Claims, 5 Drawing Sheets

DOUBLE BEARING TYPE OF A FISHING REEL HAVING A ROTATABLE AND SLIDABLE CLUTCH MEMBER SUPPORTED BY A BEARING

BACKGROUND OF THE INVENTION

1. Field of the Invention

The present invention relates to a fishing reel of a double bearing type and, in particular, to such fishing reel including a clutch member which is rotatably supported on a reel main body by the bearing, is so held by a bearing as to be movable along the axis of rotation of a spool rotatably supported between a pair of side plates of the reel main body, is so arranged as to receive a rotation force from a handle, and is movable along the spool rotation axis selectively between a rotational force transmission position for transmitting the rotational force to a spool shaft and a rotation force cut-off position for cutting off the transmission of the rotation force.

2. Description of the Related Art

Conventionally, as a double-bearing type fishing reel of the above-mentioned type, for example, there is known a fishing reel which is disclosed in Japanese Utility Model Unexamined Publication No. 4-129771 of Heisei. According to the conventional double-bearing type of fishing reel disclosed in the present publication, in a spool shaft rotatably supported between a pair of side plates included in a reel main body, as a clutch member, there is provided a pinion which is disposed in one of the above pair of side plates in such a manner that it is concentric with one end portion projectingly provided in one of the above pair of side plates and to which a rotation force from a handle can be input. The pinion is rotatably supported by a pair of bearings in one of the two side plates and is free to move in a direction along the axis of rotation of the spool shaft; and, in particular, the pinion can be moved selectively between a rotation force transmission position, in which the pinion approaches a spool along the above axis of rotation and is engaged with an engaging projection provided on the above one end portion, and a rotation force cut-off position in which the pinion moves away from the rotation force transmission position with respect to the spool and is removed from the engagement with the engaging projection.

Further, when turning the spool into its freely rotatable condition in order to play out a fishing line from the spool, by operating a clutch operation lever which is provided on and projected from the reel main body, the pinion is moved from the rotation force transmission position to the rotation force cut-off position. When transmitting the rotation force from the handle to the spool in order to take up the fishing line onto the spool, with the rotation of the handle in a given fishing line take-up direction, the pinion is moved from the rotation force cut-off position to the rotation force transmission position by a clutch opening and removing mechanism.

In the above-mentioned conventional fishing reel of a double bearing type, the engaging projection on the one end portion of the spool shaft is situated between the bearing for the pinion and the spool. For this reason, the length of the engaging projection is longer in a direction to extend along the rotation axis of the spool shaft in the above-mentioned one of the pair of side plates of the reel main body than in the other direction, and therefore, together with the handle also disposed in the above-mentioned one side plate, the imbalance between the right and left dimensions and weights of the real main body around the rod mounting portion of the fishing reel of a double bearing type is increased.

This worsens the operation feeling of a fishing rod with the above-mentioned conventional fishing reel of a double bearing type mounted thereon. This also worsens the portability of the above-mentioned conventional fishing reel of a double bearing type.

Further, in the above-mentioned conventional fishing reel of a double bearing type, for example, while something in the water or big fish is being caught on a hook connected to a fishing line, in order to take up the fishing line suddenly onto the spool, if the handle is rotated suddenly in the given fishing line take-up direction, then a large rotation force is suddenly applied not only to the engaging projection provided on one end portion of the spool shaft but also to an engaging recess formed in the pinion in engagement with the engaging projection of the spool shaft, the portion of the pinion adjacent to the engaging recess is slightly deformed in the tangential direction due to such sudden and large rotation force. In addition, if such slight deformation is repeated and the diameter of such engaging portion is thereby increased slightly, then there is required a large force to achieve the movement of the engaging portion with respect to the inner peripheral surface of the bearing in the direction extending along the rotation axis of the spool shaft, especially, the movement of the engaging portion from the rotation force cut-off position to the rotation force transmission position. Also, the use of such large force raises another problem that the operation of the clutch mechanism using the above-mentioned pinion can be disabled.

The above-mentioned movement of the pinion in the direction extending along the rotation axis of the spool shaft further suffers from the resistance that is produced by foreign substances such as dust and the like attached not only to the inner peripheral surface of the bearing but also to the engaging portion of the pinion.

Moreover, the possibility of occurrence of these problems is increased by enhancing the dimensional precision of the composing members of the clutch mechanism in order to make smooth the operation of the clutch mechanism using the above-mentioned pinion.

SUMMARY OF THE INVENTION

The present invention aims at eliminating the drawbacks found in the above-mentioned conventional fishing reel of a double bearing type. Accordingly, it is an object of the invention to provide a fishing reel of a double bearing type which decreases the imbalance between the right and left dimensions and weights of the reel main body around the rod mounting portion of a fishing reel of a double bearing type to thereby be able to improve the operation fooling of a fishing rod with the a fishing reel of a double bearing type mounted thereon as well as the portability of a fishing reel of a double bearing type.

Further, it is an another object of the invention to provide a double bearing type of fishing reel in which, even when the dimensional precision of the composing members of a clutch mechanism using a clutch member is enhanced in order to make smooth the operation of the clutch mechanism, there is eliminated the need for use of a large force to move or switch the clutch member between the rotation force cut-off position and the rotation force transmission position in spite of not only an increase in the diameter of the engaging portion of the clutch member during use but also the attachment of foreign substances and the like to the inner peripheral surface of the bearing as well as to the engaging portion of the clutch member during use, and there is also eliminated the possibility that the clutch mechanism using the clutch member can be disabled.

In attaining the above object, according to the invention, there is provided a double bearing type of fishing reel including: a reel main body having a pair of side plates; a spool having a spool shaft rotatably supported between the pair of side plates, the spool shaft defining a rotational axis of the spool shaft; a handle for inputting rotation force; a clutch member rotatably and slidably supported with respect to the reel main body by a bearing, the clutch member being movable along the rotational axis between a rotation force transmission position for transmitting the rotation force of the handle to the spool shaft and a rotation force cut-off position for cutting off the transmission of the rotation force, wherein the clutch member includes a clutch engaging portion kept in contact with the bearing during the movement of the clutch member between the rotation force transmission position and rotation force cut-off position, and further wherein, the spool shaft includes a clutch engaged portion arranged radially inside of the bearing, and engaged with the clutch engaging portion when the clutch member is positioned to the rotation force transmission position.

In a double bearing type of fishing reel according to the invention, the clutch engaging portion of the clutch member, during the above-mentioned movement, is situated in the range of the inner peripheral surface of the bearing in a direction extending along the rotation axis of the spool shaft and the clutch engaging portion of the spool shaft is situated in the range of the inner peripheral surface of the bearing in a direction extending along the rotation axis of the spool shaft. Thanks to this, when compared with the previously described conventional fishing reel of a double bearing type, the present fishing reel is able to reduce the imbalance of the right and left dimensions and weights of the reel main body around the fishing rod mounting portion thereof. Also, when compared with the operation feeling of a fishing rod with the conventional fishing reel of a double bearing type mounted thereon as well as with the portability of the conventional fishing reel of a double bearing type, the operation feeling of a fishing rod with the fishing reel of a double bearing type according to the invention mounted thereon as well as the portability of the fishing reel of a double bearing type according to the invention can be improved.

In the thus structured fishing reel of a double bearing type according to the invention, preferably, the clutch member includes a pinion to which a rotation force from a handle can be transmitted.

With use of this structure, when compared with a structure in which the clutch member and the above-mentioned pinion are independent of each other, not only the number of parts used in a double bearing type of fishing reel according to the invention can be reduced, but also the manufacturing cost, outer dimension and weight of a double bearing type of fishing reel according to the invention can be reduced.

When a double bearing type of fishing reel according to the invention is structured such that the clutch member includes a pinion to which a rotation force from a handle can be transmitted, preferably, the clutch member includes, on the outer peripheral surface of the clutch engaging portion thereof, the one-end portions of a large number of teeth of the pinion arranged in the direction extending along the rotation axis.

The formation of the one-end portions of a large number of teeth of the pinion arranged in the direction extending along the rotation axis on the outer peripheral surface of the clutch engaging portion of the clutch member reduces the surface area of the outer peripheral surface of the clutch engaging portion. As a result of this, there is reduced a friction force which is generated by the outer peripheral surface of the clutch engaging portion of the clutch member with respect to the inner peripheral surface of the above-mentioned bearing, which makes smoother the operation of the clutch member with respect to the inner peripheral surface of the bearing. Further, according to the invention, the clutch member is permitted to be inclined slightly with respect to the axis of the inner peripheral surface of the bearing. Due to this permission, the above-mentioned movement of the clutch member with respect to the inner peripheral surface of the bearing can be made smoother.

Further, in attaining the above another object, according to the invention, there is provided a double bearing type of fishing reel including: a reel main body having a pair of side plates; a spool having a spool shaft rotatably supported between the pair of side plates, the spool shaft defining a rotational axis of the spool shaft; a handle for inputting rotation force; a clutch member rotatably and slidably supported with respect to the reel main body by a bearing, the clutch member being movable along the rotational axis between a rotation force transmission position for transmitting the rotation force to the spool shaft and a rotation force cut-off position for cutting off the transmission of the rotation force, wherein the clutch member includes a clutch engaging portion being movable along the inner peripheral surface of the bearing during the movement of the clutch member between the rotation force transmission position and rotation force cut-off position, the clutch engaging portion,being engagable with the spool shaft, and further wherein the clutch engaging portion includes a rotation induce portion provided in an outer peripheral edge for guiding the clutch engaging portion to rotatably fit with the inner peripheral surface of the bearing when the clutch member is moved from the rotation force cut-off position to the rotation force transmission position.

In a double bearing type of fishing reel according to the invention, the rotation induce portion provided on the outer peripheral edge of the clutch engaging portion of the clutch element guides the clutch engaging portion into freely rotatable fit or engagement with the inner peripheral surface of the bearing during the above-mentioned movement. Thanks to this, when the dimensional precision of the composing elements of the clutch mechanism using the clutch element in order to make smooth the operation of the clutch mechanism, there is eliminated the need for use of a large force to move or switch the clutch element between the rotation force cut-off position and the rotation force transmission position in spite of not only an increase in the diameter of the engaging portion of the clutch element during use but also the attachment of foreign substances such as dust and the like to the inner peripheral surface of the bearing as well as to the engaging portion of the clutch element during use of the clutch mechanism, and there is also eliminated the possibility that the clutch mechanism using the clutch element can be disabled.

Also, preferably, the clutch engaging portion may be formed in an annular shape, and a ratio of the height of the rotation induce portion to the height of the clutch engaging portion in the radial direction of the clutch element may be set in the range of approx. 10% to approx. 50%.

Such height ratio can reconcile the function of the rotation induce portion (the smooth switching movement of the clutch element) and the function of the clutch engaging portion (the maintenance of the strength of the clutch engaging portion) for a long period of time.

Further, preferably, the clutch engaging portion may be so set as to be present in the range of the inner peripheral surface of the bearing during the above-mentioned movement of the clutch element between the rotation force transmission position and rotation force cut-off position.

This structure can reduce greatly the possibility that foreign substances such as dust and the like can be attached to the inner peripheral surface as well as to the engaging portion of the clutch element during use of the clutch element.

In a double bearing type of fishing reel according to the invention, alternatively, the rotation induce portion can also be formed of an inclined surface which is formed on the outer peripheral edge of the engaging portion of the clutch element in such a manner that it approaches the rotation axis of the spool as it moves from the outer peripheral surface of the engaging portion of the clutch element toward the spool along the rotation axis thereof. Further, this inclined surface may be formed of a straight line or a curved surface.

DETAILED DESCRIPTION OF THE PREFERRED EMBODIMENTS

Now, description will be given below in detail of various embodiments of a double bearing type of fishing reel according to the invention with reference to the accompanying drawings.

First Embodiment

At first, description will be given below in detail of a double bearing type of fishing reel according to a first embodiment of the invention with reference to FIG. 1 to FIG. 4B.

Figure 1:
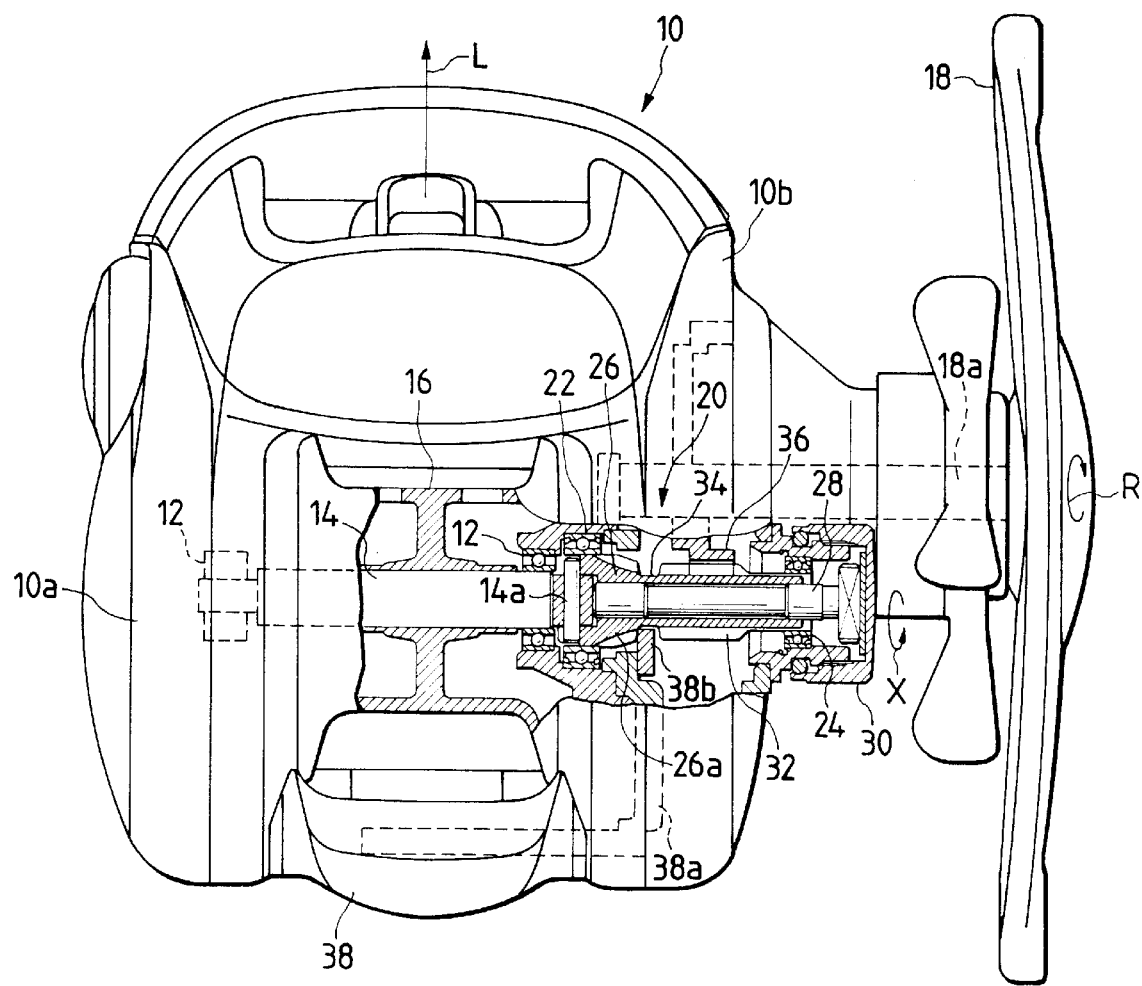
FIG. 1 is a partially cut-away plan view of a double-bearing type of fishing reel according to a first embodiment of the invention.
Figure 2:
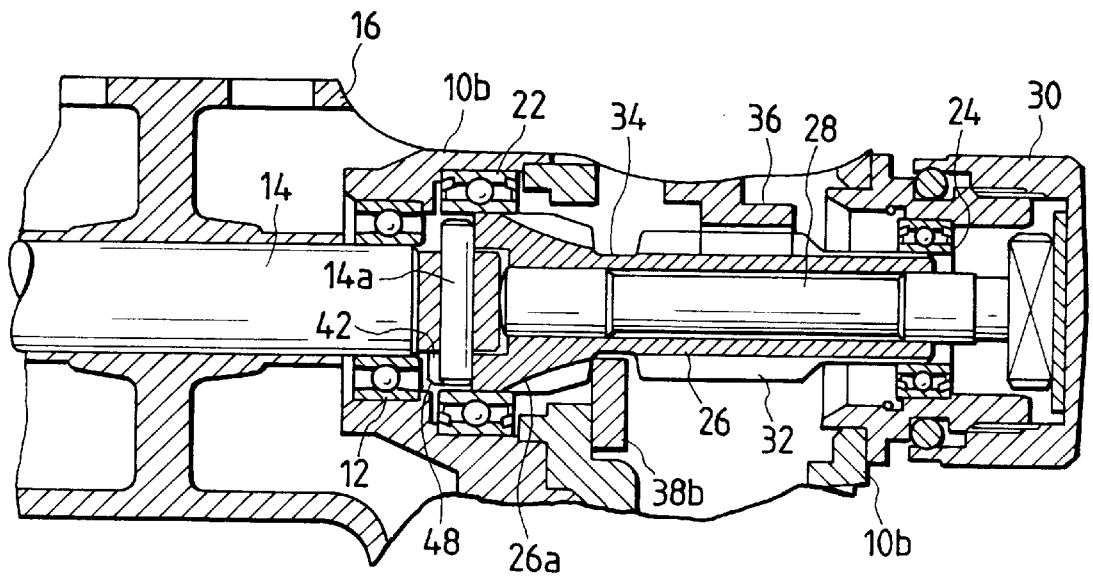
FIG. 2 is an enlarged longitudinal section view of a clutch mechanism employed in the double-bearing type of fishing reel shown in FIG. 1, illustrating a state thereof in which a clutch member thereof is situated at its rotation force transmission position.
Figure 3:
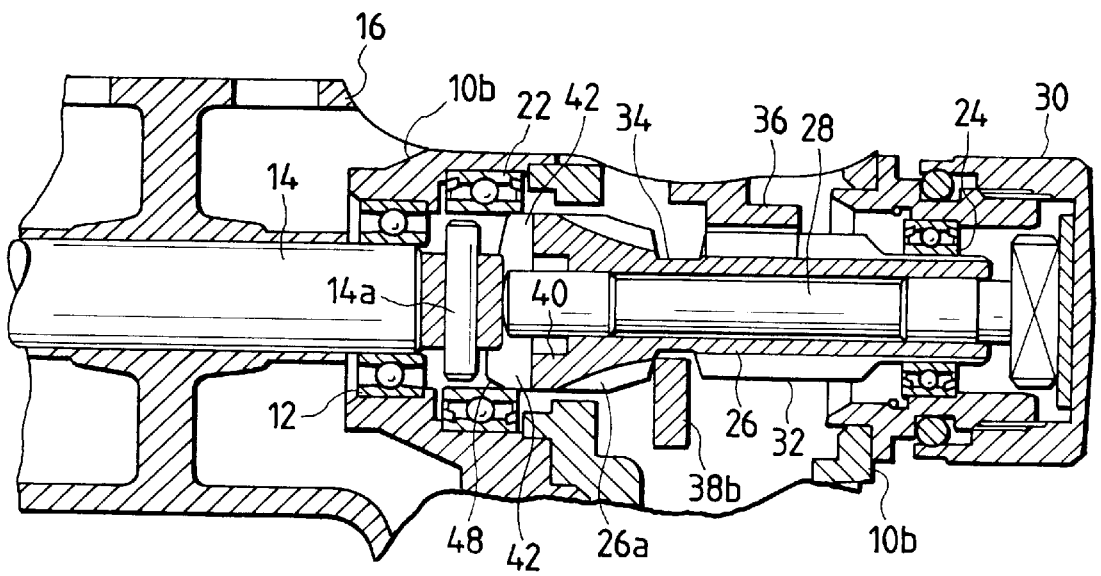
FIG. 3 is an enlarged longitudinal section view of the clutch mechanism employed in the double-bearing type of fishing reel shown in FIG. 1, illustrating a state thereof in which the clutch member thereof is situated at its rotation force cut-off position.
Figure 4A:
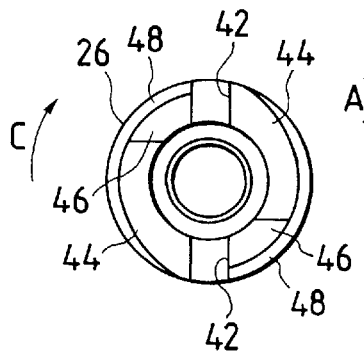
FIG. 4A is a front view of the clutch member of the clutch mechanism employed in the double-bearing type of fishing reel shown in FIG. 1.
Figure 4B:
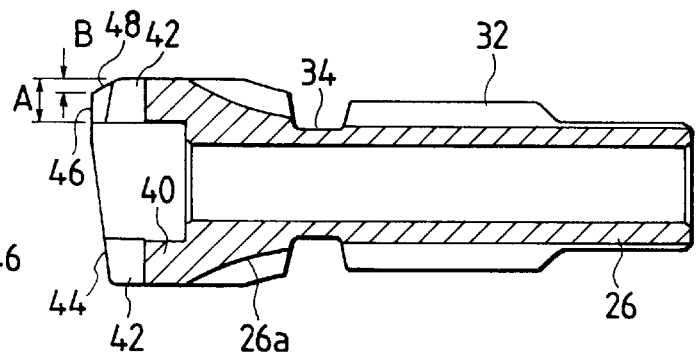
FIG. 4B is a longitudinal section view of the clutch member of the clutch mechanism employed in the double-bearing type of fishing reel shown in FIG. 1.

Referring to the figures associated with the first embodiment, FIG. 1 is a partially cut-away plan view of a double bearing type of fishing reel according to the first embodiment of the invention; FIG. 2 is an enlarged longitudinal section view of a clutch mechanism used in the double bearing type of fishing reel shown in FIG. 1, illustrating a state thereof in which a clutch member is disposed at its rotation force transmission position; FIG. 3 is an enlarged longitudinal section view of the clutch mechanism used in the double bearing type of fishing reel shown in FIG. 1, showing a state thereof in which the clutch member is disposed at its rotation force cut-off position; FIG. 4A is a front view of the clutch mechanism used in the double bearing type of fishing reel shown in FIG. 1; and, FIG. 4B is a longitudinal section view of the clutch mechanism used in the double bearing type of fishing reel shown in FIG. 1.

As shown in FIG. 1, a double bearing type of fishing real according to the first embodiment of the invention has a reel main body 10 including a pair of side plates 10*a* and 10*b*, a spool shaft 14 including two end portions which are rotatably supported on the pair of side plates 10*a* and 10*b* of the reel main body 10 by a bearing 12, a spool 16 attached concentrically to the spool shaft 14 between the pair of side plates 10*a* and 10*b* of the reel main body 10, a handle shaft 18*a* which is rotatably supported on one side plate 10*b* and includes a handle 18 fixed to a projecting portion provided on and projected from one side plate 10*b*, and a clutch mechanism 20 disposed in one side plate 10*b* to transmit a rotation force input from the handle 18 to the handle shaft 18*a* to the spool shaft 14 selectively.

The clutch mechanism 20 includes a substantially cylindrical clutch member 26. In particular, the clutch member 26 is disposed concentrically to the spool shaft 14 in one side plate 10*b*, the two end portions of the clutch member 26 are rotatably supported through a pair of bearings 22 and 24, and the clutch member 26 is also supported in such a manner that it can be moved freely in a given range along the rotation axis of the spool shaft 14 (that is, spool 16). The clutch member 26 further includes a central hole into which a center shaft 28 is inserted, while the two end faces of the central shaft 28 are respectively butted against the end face of one end portion of the spool shaft 14 in one side plate 10*b* and a shaft cover 30 removably supported on the outer wall of one side plate 10*b*, thereby restricting the movement of the clutch member 26 in a direction extending along the rotation axis of the spool shaft 14 (that is, spool 16).

The clutch member 26 is free to move on the outer peripheral surface of the center shaft 28 in the above-mentioned direction extending along the above-mentioned rotation axis of the spool, while the moving range of the clutch member 26 is restricted by the end face of one end portion of the spool shaft 14 and also by the shaft cover 30 removably supported on the outer wall of one side plate 10*b*.

On the outer peripheral surface of the clutch member 26, except for the portion thereof that adjoins the above one end portion of the spool shaft 14, there are formed a large number of given teeth 32.

Further, each of the large number of given teeth 32, in particular, the portion thereof existing in the neighborhood of the shaft cover 30 of the outer wall of one side plate 10*b* is concentrically lowered in height over a given length in the direction extending along the above spool rotation axis, thereby forming a bearing support portion for the bearing 24 which is one of the pair of bearings 22 and 24 for the clutch member 26 and is located adjacently to the outer wall of one side plate 10b. The large number of given teeth 32 left on the thus formed bearing support portion reduce the surface area of the present bearing support portion to thereby allow some degree of inclination of the clutch member 26 with respect to the axis of the inner peripheral surface of the corresponding bearing 22, which facilitates a fitting operation to fit or engage the present bearing support portion with the inner peripheral surface of the bearing 22.

The large number of given teeth 32 are further divided, in the clutch member 26, by an annular groove 34 formed at a position which is further slightly distant from the spool shaft 14 in the direction extending along the above spool shaft rotation axis from the portion adjoined the end face of the above one end portion of the spool shaft 14.

And, a rotation force transmission gear 36, which is used to transmit a rotation force input to the handle shaft 18a from the handle 18 to the clutch member 26, is in meshing engagement with the central portion of the large number of given teeth 32 on the outer peripheral surface of the clutch member 26, while the present central portion is located between the annular groove 34 and the portions of the teeth 32 that are lowered in height to form the bearing support portion for the bearing 24. Due to this structure, a rotation force, which is generated by rotating the handle 18 in its given fishing line take-up direction (which is shown by an arrow R in FIG. 1), is input to the clutch member 26 through the handle shaft 18a, rotation force transmission gear 36 and the large number of given teeth 32 on the central portion of the outer peripheral surface of the clutch member 26, thereby causing the clutch member 26 to rotate in its given fishing line take-up direction (which is shown by an arrow X in FIG. 1). That is, the large number of given teeth 32 on the central portion of the outer peripheral surface of the clutch member 26 form a pinion which is used to transmit the rotation force from the handle 18 to the clutch member 26.

Further, with the annular groove 34 formed on the outer peripheral surface of the clutch member 26, there is engaged a clutch operation plate 38b which can be operated by a connecting member 38a extended from a clutch operation lever 38 provided on and projected from the outer surface of the reel main body 10, while the clutch operation plate 38b is energized in one side plate 10b in a direction to approach one end portion of the spool shaft 14 in one side plate 10b by well-known energizing means (not shown).

In FIG. 1, if the clutch operation lever 38 is pressed downward in a direction perpendicular to the sheet surface of the drawing of FIG. 1, then the clutch operation plate 38b is moved together with the clutch member 26 by a given distance from its position shown in FIG. 1 to the right against the energizing force of the energizing means (not shown). As a result of this, the end portion of the clutch member 26 adjoining the end face of the above-mentioned one end portion of the spool shaft 14 is moved in the direction extending along the above-mentioned spool shaft rotation axis from the end face of the above-mentioned one end portion of the spool shaft 14 to its rotation force cut-off position which is distant by a given distance from the present end face.

After then, if the handle 18 is rotated in the given fishing line take-up direction (which is shown by the arrow R in FIG. 1), due to the operation of a well-known clutch opening and removing mechanism (not shown) interposed between the handle shaft 18a and clutch operation plate 38b, the clutch operation plate 30b is then moved together with the clutch member 26 by the above-mentioned given distance to the left in FIG. 1 from the above rotation force cut-off position by means of the energizing force of the energizing means (not shown), while the clutch operation lever 38 is also returned from its lower or depressed position in a direction perpendicular to the sheet surface of the drawing of FIG. 1 back to its upper or initial position before it is pressed down. As a result of this, the end portion of the clutch member 26 adjoining the end face of the above-mentioned one end portion of the spool shaft 14 is moved in the direction extending along the above-mentioned spool shaft rotation axis by a given distance from the rotation force cut-off position toward the end face of the above-mentioned one end portion of the spool shaft 14 and, as shown in FIG. 1, is thereby returned back to tho rotation force transmission position at which it is in contact with the end face of the above-mentioned one end portion of the spool 14.

In the above-mentioned one end portion of the spool shaft 14 projecting into one side plate 10b and the end portion of the clutch member 26 adjoining the above-mentioned one end portion of the spool 14, there are respectively provided engaging portions 14a and 26a which are to be engaged with each other in the peripheral direction when the clutch member 26 is situated at the above-mentioned rotation force transmission position shown in FIG. 1 and also which are to be removed from their mutual engagement in the peripheral direction when the clutch member 26 is situated at the above-mentioned rotation force cut-off position.

In FIG. 2, the engaging portion 14a of the above-mentioned one end portion of the spool shaft 14 is shown in an enlarged manner. In the present embodiment, the engaging portion 14a of the above-mentioned one end portion of the spool shaft 14 is composed of an engaging pin which is projected from the outer peripheral surface of the above-mentioned one end portion in the diametrical direction of the rotation axis of the spool shaft 14. Also, the engaging portion 14a (engaging pin) of the spool shaft 14 is situated in the range of the inner peripheral surface of the bearing 22 used for the end portion of the clutch member 26 adjoining the above-mentioned end portion of the spool shaft 14.

In FIGS. 4A and 4B, the engaging portion 26a of the end portion of the clutch member 26 adjoining the above-mentioned one end portion of the spool shaft 14 is shown in detail.

The engaging portion 26a of the clutch member 26 includes a annular projection 40 which has an inner peripheral surface slightly larger than the diameter of the outer peripheral surface of the above-mentioned one end portion of the spool shaft 14 and also which is concentric with the spool shaft 14, while the annular projection 40 includes a projecting end face in which there are formed a pair of engaging recesses 42 respectively disposed in the diametrical direction of the rotation axis of the spool shaft 14.

When the projecting end face of the annular projection 40 is viewed from front as shown in FIG. 4A (in FIGS. 1, 2 and 4B, it is viewed from left), the respective widths of the pair of engaging recesses 42 are set slightly larger than the width of the engaging portion 14a (that is, engaging pin) when the end face of the above-mentioned one end portion of the spool shaft 14 is viewed from right in FIGS. 1 and 2; and, when the annular projection 40 is viewed from side as shown in FIGS. 1, 2 and 4B, the respective depths of the pair of engaging recesses 42 are set larger than the width of the engaging portion 14a (that is, engaging pin) when the above-mentioned one end portion of the spool shaft 14 is viewed from side as shown in FIGS. 1 and 2.

Moreover, when the projecting end face of the annular projection 40 is viewed from front as shown in FIG. 4A, the portions thereof respectively extended clockwise from their respective engaging recesses 42 are composed of inclined surfaces 44 which increase gradually in height as they become more distant clockwise from their respective engaging recesses 42 ("clockwise" designates a direction shown by arrow C of FIG. 4A); and, the portions of the annular projection 40 projecting end face, which extend from the extension ends of the inclined surfaces 44 to their respective engaging recesses 42 in the above-mentioned clockwise direction, are respectively composed of flat surfaces 46 which are contained in a virtual plane intersecting at right angles to the axis of the annular projection 40.

Further, in the outer peripheral edge of the projecting end face (that is, the outer peripheral edge of the engaging portion 26a) of the above-structured annular projection 40, there are provided rotation induce portions 48 which are used to induce the clutch engaging portion 26a into freely rotatable fitting or engagement with the inner peripheral surface of its corresponding bearing 22 while the clutch member 26 is moving between the rotation force transmission position and the rotation force cut-off position.

In the present embodiment, each of the rotation induce portions 48 is structured by chamfering the outer peripheral edge of the projecting end face of the annular projection 40 linearly. However, the rotation induce portion 48 can also be structured by chamfering the above outer peripheral edge in an outwardly projecting curve.

In addition, the ratio of the height B of the rotation induce portion 48 to the height A of the annular projection 40 of the clutch engaging portion 26a in the radial direction of the clutch member 26 is set substantially in the range of 10% to 50%. This ratio is set so that the annular projection 40 of the clutch engaging portion 26a has a strength to be able to fully fulfil its function as well as the rotation induce portion 48 is also able to fully fulfil its function.

Unless the clutch operation lever 38 shown in FIG. 1 is pressed downwardly in the direction perpendicular to the sheet surface of the drawing of FIG. 1, as described above, the clutch member 26 is situated at the rotation force transmission position at which the engaging portion 26a thereof adjoining the above-mentioned one end portion of the spool shaft 14 is in contact with the engaging portion 14a of the above-mentioned one end portion of the spool shaft 14, as shown in FIG. 1. Further, at this rotation force transmission position, the engaging portion 26a of the clutch member 26, as shown in FIG. 2, causes the engaging portion 14a (that is, engaging pin) of the above-mentioned one end portion of the spool shaft 14 to be inserted into the pair of engaging recesses 42.

Therefore, in this state, if the handle 18 is rotated in the given fishing line take-up direction (which is shown by the arrow R in FIG. 1), then a rotation force generated by such rotation of the handle 18 is input through the handle shaft 18a, the rotation force transmission gear 36, and the large number of given teeth 32 in the central portion of the outer peripheral surface of the clutch member 26 to the clutch member 26, thereby causing the clutch member 26 to rotate in the given fishing line take-up direction (which is shown by the arrow X in FIG. 1). Further, the rotation force input from the handle 18 into the clutch member 26 in this manner is then transmitted through the spool shaft 14 to the spool 16 by the engaging portion 26a of the clutch member 26 and the engaging portion 14a of the above-mentioned one end portion of the spool shaft 14 which, as described before, are engaged with each other in the peripheral direction, thereby causing the rotation of the spool 16 in the given fishing line take-up direction (which is shown by the arrow X in FIG. 1) similarly to the clutch member 26. As a result of this, a fishing line (not shown) is taken up in the fishing line take-up direction (a direction exactly opposite to a fishing line play-out direction shown by an arrow L in FIG. 1) onto the outer peripheral surface of the spool 16.

While the clutch member 26 is being situated at the rotation force transmission position, as shown in FIG. 2, the outer peripheral surface of the engaging portion 26a of the clutch member 26 is supported by the inner peripheral surface of its corresponding bearing 22 to thereby function as the bearing support portion. And, it is important that, on the outer peripheral surface of the engaging portion 26a, each of the plurality of teeth 32 of the clutch member 26 includes one end part which is located nearer to the above-mentioned one end portion of the spool shaft 14 than the annular groove 34.

The reason for this is that the above-mentioned one end parts of the respective teeth 32 reduce the surface area of the bearing support portion constituted by the outer peripheral surface of the engaging portion 26a of the clutch member 26 supported by the inner peripheral surface of the bearing 22 to allow the slight inclination of the clutch member 26 with respect to the axis of the inner peripheral surface of its corresponding bearing 22, thereby facilitating the operation to fit or engage the engaging portion 26a (bearing support portion) with the inner peripheral surface of the bearing 22.

In order to allow the fishing line to be played out freely from the spool 16 in the fishing line play-out direction shown by the arrow L in FIG. 1, the clutch operation lever 38 is pressed downwardly in a direction perpendicular to the sheet surface of the drawing. In response to this, the clutch operation plate 38b is moved together with the clutch member 26 by a given distance to the right from the position shown in FIG. 1 against the energizing force of the energizing means (not shown). As a result of this, the engaging portion 26a of the clutch member 26 is moved from the engaging portion 14a of the spool shaft 14 to the rotation force cut-off position shown in FIG. 3 which is distant from the engaging portion 14a by a given distance in a direction extending along the rotation axis of the spool shaft 14.

As shown in FIG. 3, in the present embodiment, the outer peripheral surface of the engaging portion 26a of the clutch member 26 at the rotation force cut-off position is situated in the range of the inner peripheral surface of the corresponding bearing 22 in the direction extending along the rotation axis of the spool shaft 14.

In this manner, in the present embodiment, the outer peripheral surface of the engaging portion 26a of the clutch member 26 at the rotation force cut-off and transmission positions, as shown in FIGS. 3 and 2, is situated in the range of the inner peripheral surface of the corresponding bearing 22 in the direction extending along the rotation axis of the spool shaft 14 and, at the same time, as shown in FIGS. 3 and 2, even when the clutch member 26 is situated at both of the rotation force cut-off and transmission positions, the engaging portion 14a of the spool shaft 14 is also situated in the range of the inner peripheral surface of the corresponding bearing 22.

Due to this, in one side plate 10b of the pair of side plates 10a and 10b of the reel main body 10 shown in FIG. 1, the length of the spool shaft 14 in the direction extending along the rotation axis thereof can be reduced, and with the handle 18 disposed in one side plate 10b, the imbalance of the right and left dimensions and weights of the reel main body 10 around the rod mounting portion of the double-bearing type fishing reel according to the present embodiment are reduced.

Also, this improves not only the operation feeling of a fishing rod on which the double-bearing type fishing reel according to the present embodiment is mounted but also the portability of the double-bearing type fishing reel according to the present embodiment.

After then, if the handle 18 is rotated in the given fishing line take-up direction (which is shown by the arrow R in FIG. 1), due to the operation of the clutch opening and removing mechanism (not shown) interposed between the handle shaft 18a and clutch operation plate 39b, the clutch operation plate 38b is then moved together with the clutch member 26 from the above-mentioned rotation force cut-off position shown in FIG. 3 by a given distance to the left in FIG. 3 owing to the energizing force of the energizing means (not shown), and the clutch operation lever 38 is also moved from the lower depressed position in the direction perpendicular to the sheet surface of the drawing of FIG. 1 and is thereby returned to its upper or initial position before it is pressed down. As a result of this, the clutch member 26 is moved from the rotation force cut-off position shown in FIG. 3 toward the engaging portion 14a of the spool shaft 14 by a given distance in the direction extending along the rotation axis of the spool shaft 14 and thus the inclined surfaces 44 of the end face of the engaging portion 26a of the clutch member 26 are butted with the engaging portion 14a of the spool shaft 14, so that the engaging portion 14a of the spool shaft 14 is guided by the inclined surfaces 44 and is then introduced into the engaging recesses 42 of the engaging portion 26a of the clutch member 26, so that, finally, as shown in FIGS. 1 and 2, the clutch member 26 is returned to the rotation-force transmission position in which the engaging portion 26a of the clutch member 26 is in engagement with the engaging portion 14a of the spool shaft 14.

Further, according to the present embodiment, when the clutch member 26 is moved from the rotation force cut-off position shown in FIG. 3 to the rotation force transmission position shown in FIGS. 1 and 2, the inclined rotation induce portion 48 provided on the outer peripheral edge of the end face of the engaging portion 26a of the clutch member 26 is brought into sliding contact with the inner peripheral surface of the corresponding bearing 22.

For example, while something in the water or big fish is being caught on a hook connected to a fishing line (not shown), in order to take up the fishing line suddenly onto the spool 16 shown in FIG. 1, if the handle 18 shown in FIG. 1 is rotated suddenly in the given fishing line take-up direction (which is shown by the arrow R in FIG. 1), then a large rotation force is suddenly applied not only to the engaging portion 14a of the spool shaft 14 but also to the engaging recesses 42 of the engaging portion 26a of the clutch member 26 in engagement with the engaging portion 14a of the spool shaft 14, the portions of the engaging portion 26a of the clutch member 26 adjacent to the engaging recesses 42 are slightly deformed in the tangential direction due to such sudden and large rotation force, and the diameter of the engaging portion 26a is slightly enlarged by repetitions of such slight deformation; that is, even in this case, resistance, which is caused to occur in the outer peripheral edge of the end face of the engaging portion 26a by the movement of the engaging portion 26a of the clutch member 26 with respect to the inner peripheral surface of the corresponding bearing 22 in the direction extending along the rotation axis of the spool shaft 14a, especially by the movement of the engaging portion 26a of the clutch member 26 from the rotation force cut-off position to the rotation force transmission position, can be relieved by the inclined rotation induce portion 48 of the present outer peripheral edge, thereby eliminating the need to use such a large force for the purpose of achieving the movement of the engaging portion 26a. This also can eliminate the possibility that the operation of the clutch mechanism using the above-mentioned clutch member 26 can be disabled. In addition, since the rotation force is large applied to a wall part between the engaging recess 44 and the flat surface 46, the rotation induce portion 48 is chamfered so as to gradually increase clockwise from a wall part between the engaging recess 42 and the inclined surface 44 toward the wall part between the engaging recess 42 and the flat surface 46.

Further, there can be reduced the resistance that the above-mentioned movement-of the clutch member 26 in the direction extending along the rotation axis of the spool shaft 14 receives from a foreign body such as dust or the like attached to the inner peripheral surface of the corresponding bearing 22 and the engaging portion 26a of the clutch member 26.

In addition, in spite of the fact that the dimensional precision of the composing members of the clutch mechanism is enhanced in order to be able to carry out smoothly the operation of the clutch mechanism using the above-mentioned clutch member 26, there is no possibility that the resistance caused by the above-mentioned movement of the clutch member 26 can decrease.

By the way, in the above-mentioned embodiment, at its rotation force cut-off position, the engaging portion 26a of the clutch member 26 is in the range of the inner peripheral surface of the corresponding bearing 22. However, at its rotation force cut-off position, even if the engaging portion 26a of the clutch member 26 moves out of the range of the inner peripheral surface of the corresponding bearing 22, when the clutch member 26 moves from the rotation force cut-off position to the rotation force transmission position, the inclined rotation induce portion 48 on the outer periphery of the end face of the engaging portion 26a functions similarly to the above-mentioned case.

Second Embodiment

Figure 5:
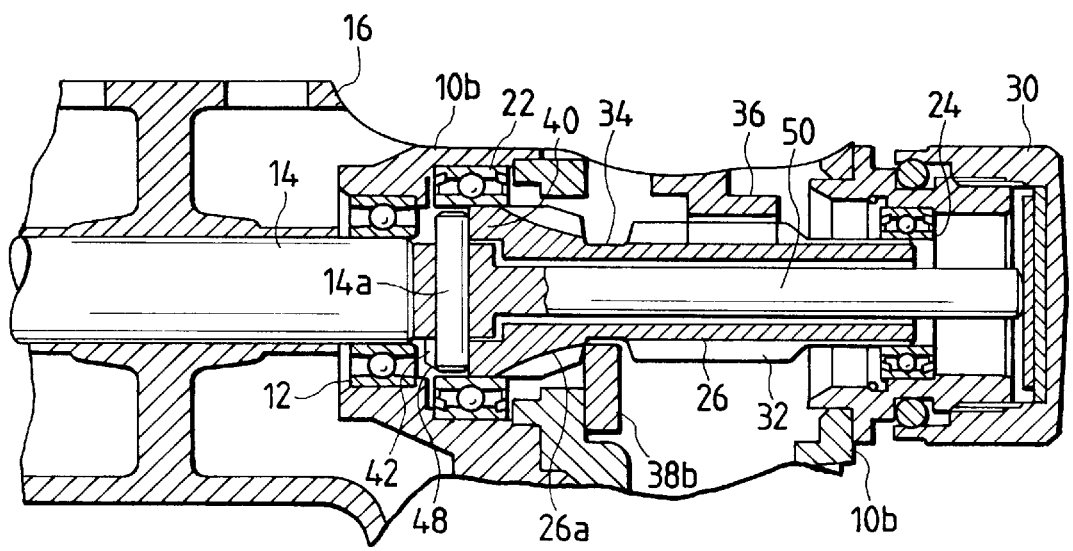
FIG. 5 is an enlarged longitudinal section view of a clutch mechanism employed in a double-bearing type of fishing reel according to a second embodiment of the invention, showing a state thereof in which a clutch member thereof is situated at its rotation force transmission position.

Next, description will be given below of a double-bearing type of fishing reel according to a second embodiment of the invention with reference to FIG. 5. Here, FIG. 5 is an enlarged longitudinal section view of a clutch mechanism employed in the double-bearing type of fishing reel according to the second embodiment of the invention, illustrating a state thereof in which a clutch member thereof is arranged at its rotation force transmission position.

In addition, most of the components of the double-bearing type of fishing reel according to the second embodiment of the invention are the same as those of the double-bearing type of fishing reel according to the first embodiment of the invention which has been previously described with reference to FIGS. 1 to 4. Therefore, most of the components of the double-bearing type of fishing reel according to the second embodiment are given the same designations as their corresponding components of the double-bearing type of fishing reel according to the first embodiment of the invention and thus the detailed description thereof is omitted here.

The double-bearing type of fishing reel according to the second embodiment of the invention is different from the double-bearing type of fishing reel according to the first embodiment of the invention in that a center shaft 50 inserted into the center hole of the clutch member 26 is formed concentrically and integrally with one end portion of the spool shaft 14 which is situated in one side plate 10b.

And, the operations of the various components of the double-bearing type of fishing reel according to the second embodiment are identical with the operations of the various components of the double-bearing type of fishing reel according to the first embodiment.

Third Embodiment

Figure 6:
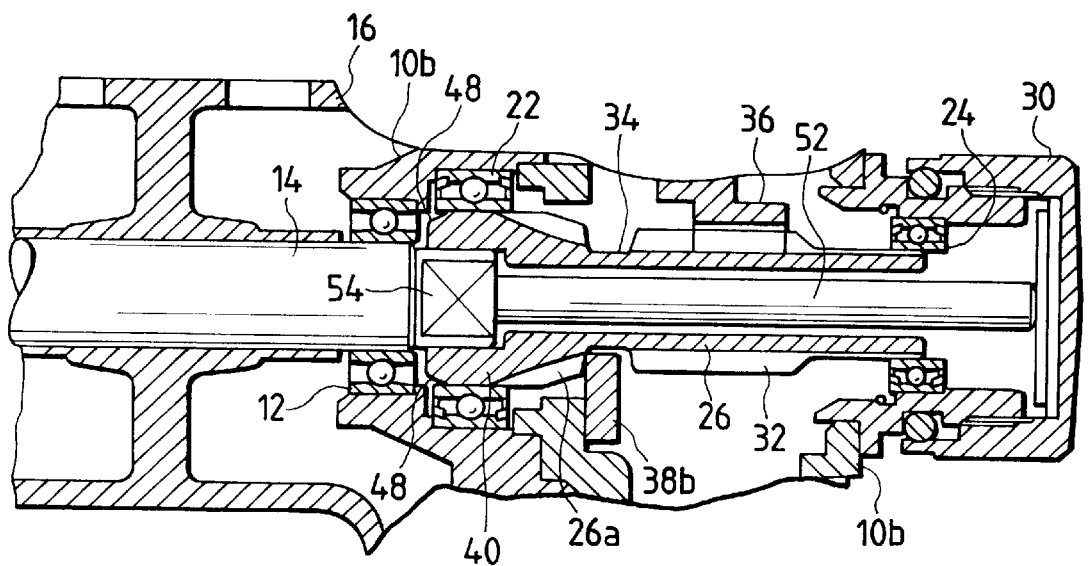
FIG. 6 is an enlarged longitudinal section view of a clutch mechanism employed in a double-bearing type of fishing reel according to a third embodiment of the invention, showing a state thereof in which a clutch member thereof is situated at its rotation force transmission position.
Figure 7A:
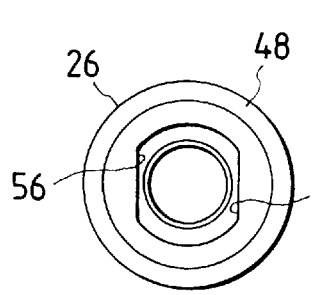
FIG. 7A is a front view of the clutch member of the clutch mechanism employed in the double-bearing type of fishing reel shown in FIG. 6.
Figure 7B:
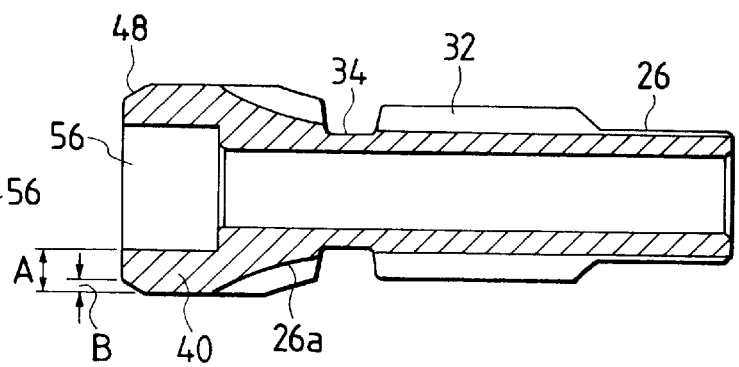
FIG. 7B is a longitudinal section view of the clutch member of the clutch mechanism employed in the double-bearing type of fishing reel shown in FIG. 6.

Next, description will be given below of a double-bearing type of fishing reel according to a third embodiment of the invention with reference to FIG. 6 and FIGS. 7A and 7B. Here, FIG. 6 is an enlarged longitudinal section view of a clutch mechanism employed in the double-bearing type of fishing reel according to the third embodiment of the invention, showing a state thereof in which a clutch member thereof is situated at its rotation force transmission position; FIG. 7A is a front view of the clutch member of the clutch mechanism of the double-bearing type of fishing reel shown in FIG. 6; and, FIG. 7B is a longitudinal section view of the clutch member of the clutch mechanism of the double-bearing type of fishing reel shown in FIG. 6.

Moreover, most of the components of the double-bearing type of fishing reel according to the third embodiment of the invention are the same as those of the double-bearing type of fishing reel according to the first embodiment of the invention which has been previously described with reference to FIGS. 1 to 4B, while part of the remaining components of the third embodiment are the same as part of the components of the double-bearing type of fishing reel according to the second embodiment of the invention which has been previously described with reference to FIG. 5. Therefore, most of the components as well as part of the remaining components of the double-bearing type of fishing reel according to the third embodiment are given the same designations as their corresponding most components of the double-bearing type of fishing reel according to the first embodiment of the invention as well as their corresponding part of the components of the double-bearing type of fishing reel according to the second embodiment of the invention, and thus the detailed description thereof is omitted here.

The double-bearing type of fishing reel according to the third embodiment of the invention is different from the double-bearing type of fishing reel according to the first embodiment of the invention in that a center shaft 52 inserted into the center hole of the clutch member 26 is formed concentrically and integrally with one end portion of the spool shaft 14 which is situated in one side plate 10b. Also, in the third embodiment, unlike the first embodiment, an engaging portion 54 formed in the above-mentioned one end portion of the spool shaft 14 is composed of a pair of planes which are formed in the outer peripheral surface of the above-mentioned one end portion of the spool shaft 14 and are arranged parallel to each other; and, in the inner peripheral surface of the engaging portion 40 of the clutch member 26, there are formed a pair of mutually parallel arranged planes 56 which correspond to the pair of mutually parallel arranged planes of the engaging portion 54 of the spool shaft 14.

In the third embodiment, as shown in FIG. 6, when the clutch member 26 is situated at its rotation force transmission position, the pair of mutually parallel planes. 56 of the inner peripheral surface of the engaging portion 40 of the clutch member 26 are engaged with the pair of mutually parallel planes of the engaging portion 54 of the spool shaft 14 overlappingly in the peripheral direction. In addition, the clutch member 26 is moved to the right along the center shaft 32 by a given distance from the rotation force transmission position shown in FIG. 6 and is situated at its rotation force cut-off position by operating of the clutch operation lever 38 (see FIG. 1), and the pair of mutually parallel planes 56 of the inner peripheral surface of the engaging portion 40 of the clutch member 26 are moved apart from the pair of mutually parallel planes of the engaging portion 54 of the spool shaft 14, thereby removing their engagement in the peripheral direction.

In the third embodiment an well, the ratio of the height B of the rotation induce portion 48 to the height A of the annular projection 40 of the clutch engaging portion 26a in the radial direction of the clutch member 26 is set substantially in the range of 10% to 50%. This ratio is set so that the annular projection 40 of the clutch engaging portion 26a has a strength to be able to fully fulfil its function as well as the rotation induce portion 48 is also able to fully fulfil its function.

Further, the operations of the various components of the double-bearing type of fishing reel according to the third embodiment are identical with the operations of the various components of the double-bearing type of fishing reel according to the first embodiment.

Fourth Embodiment

Figure 8:
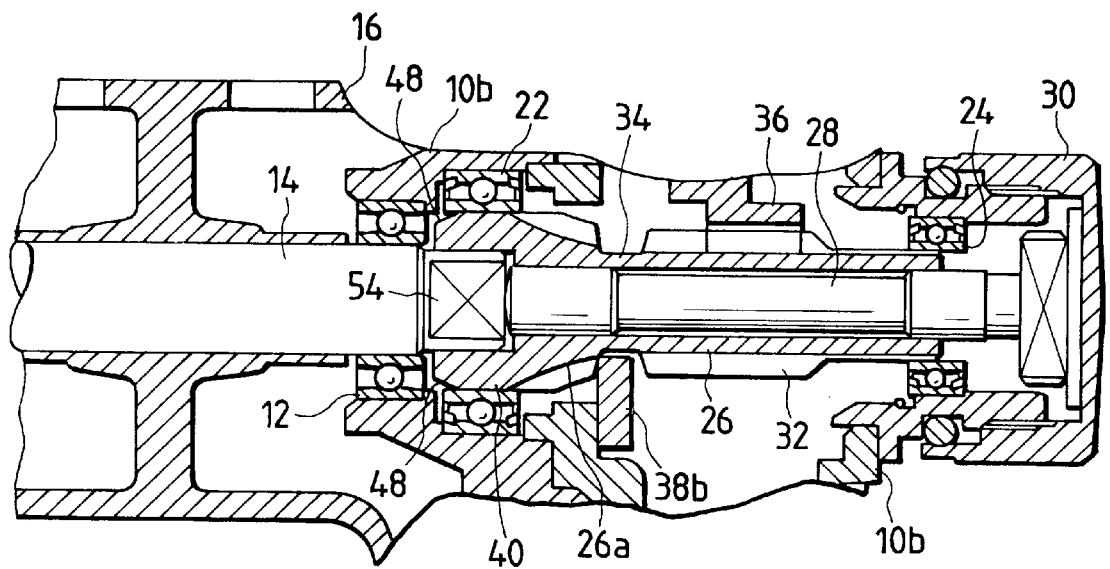
FIG. 8 is an enlarged longitudinal section view of a clutch mechanism employed in a double-bearing type of fishing reel according to a fourth embodiment of the invention, showing a state thereof in which a clutch member thereof is situated at its rotation force transmission position.

Next, description will be given below of a double-bearing type of fishing reel according to a fourth embodiment of the invention with reference to FIG. 8. Here, FIG. 8 is an enlarged longitudinal section view of a clutch mechanism employed in the double-bearing type of fishing reel according to the fourth embodiment of the invention, illustrating a state thereof in which a clutch member thereof is arranged at its rotation force transmission position.

Moreover, most of the components of the double-bearing type of fishing reel according to the fourth embodiment of the invention are the same as those of the double-bearing type of fishing reel according to the first embodiment of the invention which has been previously described with reference to FIGS. 1 to 4B, while the remaining components of the fourth embodiment are the same as part of the components of the double-bearing type of fishing reel according to the third embodiment of the invention which has been previously described with reference to FIG. 6 and FIGS. 7A and 7B.

Therefore, most of the components of the double-bearing type of fishing reel according to the fourth embodiment as well as the remaining components thereof are given the same designations as their corresponding most components of the double-bearing type of fishing reel according to the first embodiment of the invention as well as their corresponding part of the components of the double-bearing type of fishing reel according to the third embodiment of the invention, and thus the detailed description thereof is omitted here.

The double-bearing type of fishing reel according to the fourth embodiment of the invention is different from the double-bearing type of fishing reel according to the first embodiment of the invention in that, similarly to the double-bearing type of fishing reel according to the third embodiment, an engaging portion 54 formed in the above-mentioned one end portion of the spool shaft 14 is composed of a pair of planes which are formed in the outer peripheral surface of the above-mentioned one end portion of the spool shaft 14 and are arranged parallel to each other and, in the inner peripheral surface of the engaging portion 40 of the clutch member 26, there are formed a pair of mutually parallel arranged planes 56 which correspond to the pair of mutually parallel arranged planes of the engaging portion 54 of the spool shaft 14.

And, the operations of the various components of the double-bearing type of fishing reel according to the fourth embodiment are identical with the operations of the corresponding various components of the double-bearing type of fishing reel according to the first embodiment and the corresponding various components of the double-bearing type of fishing reel according to the third embodiment.

The foregoing description of the preferred embodiments of the invention has been presented for the purpose of illustration and description only. It is not intended to be exhaustive or to limit the invention to the precise form disclosed, and modifications and variations are possible in light of and within the scope of the invention. The preferred embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and equivalents thereof.

Effects of the Invention

As has been described heretofore in detail, according to a double-bearing type of fishing reel in accordance with the invention, by reducing the imbalance of the right and left dimensions and weights of the reel main body around the rod mounting portion thereof, not only the operation feeling of a fishing rod with the present double-bearing type of fishing reel mounted thereon but also the portability of the present double-bearing type of fishing reel can be improved. Moreover, even if the dimensional precision of the composing members of the clutch mechanism using the clutch member in order to make smooth the operation of the clutch mechanism is provided, there is eliminated the need for use of a large force to move or switch the clutch member between the rotation force cut-off position and the rotation force transmission position in spite of not only an increase in the diameter of the engaging portion of the clutch member during use but also the attachment of foreign substances such as dust and the like to the inner peripheral surface of the bearing as well as to the engaging portion of the clutch member during use of the clutch mechanism, and there is also eliminated the possibility that the clutch mechanism using the clutch member can be disabled.

What is claimed is:

1. A double bearing type of fishing reel comprising:
   a reel main body having a pair of side plates;
   a spool having a spool shaft rotatably supported between said pair of side plates, said spool shaft defining a rotational axis of said spool;
   a handle for inputting rotation force;
   a clutch member rotatably and slidably supported with respect to said reel main body by a bearing having an inner peripheral surface, said clutch member being movable along said rotational axis between a rotation force transmission position for transmitting the rotation force of said handle to the spool shaft and a rotation force cut-off position for cutting off the transmission of the rotation force,
   wherein said clutch member includes a clutch engaging portion kept in contact with said bearing during the movement of said clutch member from said rotation force transmission position to said rotation force cut-off position and vice versa, and further wherein,
   said spool shaft includes a clutch engaged portion engaged with said clutch engaging portion when said clutch member is in said rotation force transmission position, and arranged within a space defined by said inner peripheral surface of said bearing when said clutch member is in said rotation force transmission position and said rotation force cut-off position, respectively.

2. A double bearing type of fishing reel according to claim 1, wherein said clutch member further includes a pinion to which said rotation force from said handle is transmitted.

3. A double bearing type of fishing reel according to claim 2, wherein said pinion comprises a plurality of teeth, and axial termini of said teeth of said pinion are adjacent to said clutch engaging portion.

4. A double bearing type of fishing reel according to claim 2, further comprising:
   an additional bearing arranged opposite to said bearing with respect to said pinion, said additional bearing rotatably and slidably supporting said clutch member with said bearing.

5. A double bearing type of fishing reel according to claim 1, wherein said clutch member has an annular shape, and wherein a central shaft, integrally formed with said spool shaft, is inserted in said clutch member.

6. A double bearing type of fishing reel according to claim 1, wherein said clutch member has an annular shape, and wherein a central shaft, separately formed and attached to said spool shaft, is inserted in said clutch member.

7. A double bearing type of fishing reel comprising:
   a reel main body having a pair of side plates;
   a spool having a spool shaft rotatably supported between said pair of side plates, said spool shaft defining a rotational axis of said spool;
   a handle for inputting rotation force;
   a clutch member rotatably and slidably supported with respect to said reel main body by a bearing having an inner peripheral surface, said clutch member being movable along said rotational axis from a rotation force transmission position for transmitting the rotation force of said handle to the spool shaft to a rotation force cut-off position for cutting off the transmission of the rotation force of said handle and vice versa,
   wherein said clutch member includes a clutch engaging portion being movable along said inner peripheral surface of said bearing during the movement of said clutch member between said rotation force transmission position and said rotation force cut-off position, said clutch engaging portion being engagable with said spool shaft, and further wherein
   said clutch engaging portion includes a rotation induce portion for guiding said clutch engaging portion to rotatably fit within said inner peripheral surface of said bearing when said clutch member is moved from said rotation force cut-off position to said rotation force transmission position,
   wherein said rotation induce portion comprises a chamfered outer peripheral edge of said clutch engaging portion,
   wherein said spool shaft includes a clutch engaged portion being engaged with said clutch engaging portion when said clutch member is positioned to said rotation force transmission position, and wherein an axial end of said clutch engaging portion has a plurality of engaging recesses engagable with said clutch engaged portion, a plurality of flat surfaces which are orthogonal to the rotational axis and a plurality of inclined surfaces which are oblique with respect to said plurality of flat surfaces.

8. A double bearing type of fishing reel according to claim 7, wherein said clutch engaging portion is formed in an annular shape, and a ratio of the height of said rotation induce portion to the height of said clutch engaging portion in a radial direction of said clutch member is set in the range of approximately 10% to approximately 50%.

9. A double bearing type of fishing reel according to claim 7, wherein said clutch engaging portion is kept in contact with said bearing during said movement of said clutch member from said rotation force transmission position to said rotation force cut-off position and vice versa.

10. A double bearing type of fishing reel according to claim 7, wherein said rotation induce portion extends circumferentially from a first wall part between said engaging recess and said inclined surface to a second wall part between said engaging recess and said flat surface.

* * * * *